US012658572B2

(12) United States Patent
Mohan et al.

(10) Patent No.: US 12,658,572 B2
(45) Date of Patent: Jun. 16, 2026

(54) POSITIONING A DEVICE

(71) Applicant: Telefonaktiebolaget LM Ericsson (PUBL), Stockholm (SE)

(72) Inventors: Saravanan Mohan, Chennai (IN); M Srinidhi, Chennai Tamil Nadu (IN); Sethuraman TV, Chennai (IN); Pooja Sanathkumar, Chennai (IN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 531 days.

(21) Appl. No.: 18/042,710

(22) PCT Filed: Aug. 27, 2020

(86) PCT No.: PCT/IN2020/050748
§ 371 (c)(1),
(2) Date: Feb. 23, 2023

(87) PCT Pub. No.: WO2022/044027
PCT Pub. Date: Mar. 3, 2022

(65) Prior Publication Data
US 2023/0344119 A1      Oct. 26, 2023

(51) Int. Cl.
H01Q 3/00          (2006.01)
G01S 5/16          (2006.01)
(Continued)

(52) U.S. Cl.
CPC ................. H01Q 3/08 (2013.01); G01S 5/16 (2013.01); H01Q 1/1257 (2013.01)

(58) Field of Classification Search
CPC .......... H01Q 3/08; H01Q 1/1257; G01S 5/16
See application file for complete search history.

(56) References Cited

U.S. PATENT DOCUMENTS

| | | | | |
|---|---|---|---|---|
| 11,175,369 B1 * | 11/2021 | Erad | ....................... | G01S 3/043 |
| 2015/0245311 A1 * | 8/2015 | Wang | ....................... | G01S 5/14 |
| | | | | 455/456.1 |

(Continued)

FOREIGN PATENT DOCUMENTS

| | | | | |
|---|---|---|---|---|
| WO | WO-2017122194 A1 * | 7/2017 | ........... | H04B 7/0626 |
| WO | 2018 057184 A1 | 3/2018 | | |

OTHER PUBLICATIONS

Jiachen Yang et al., CM3: "Cooperative Multi-Goal Multi-Stage Multi-Agent Reinforcement Learning", published as a conference paper at ICLR 2020—Jan. 24, 2020.

(Continued)

*Primary Examiner* — Khai M Nguyen
(74) *Attorney, Agent, or Firm* — Baker Botts L.L.P.

(57)          ABSTRACT

Embodiments described herein relate to methods and apparatus for positioning a device to communicate with a transmitter. In one embodiment the method comprises receiving a communications signal (115, 390) from the transmitter (405), the communications signal comprising electromagnetic radiation having a wavelength corresponding to line-of-sight propagation only; determining a first spatial parameter of the device and a signal parameter of the communications signal using the received communications signal (410, 415, 420); determining second spatial parameters using the first spatial parameter and the signal parameter (425), the second spatial parameters for positioning the device to improve communication with the transmitter.

20 Claims, 4 Drawing Sheets

(51) Int. Cl.
H01Q 1/12 (2006.01)
H01Q 3/08 (2006.01)

(56) References Cited

U.S. PATENT DOCUMENTS

| | | | | |
|---|---|---|---|---|
| 2015/0373503 A1* | 12/2015 | Jovicic | ................. | H04W 4/029 |
| | | | | 455/456.1 |
| 2017/0063457 A1 | 3/2017 | Yamasaki et al. | | |
| 2017/0162951 A1* | 6/2017 | Lee | ....................... | H01Q 21/29 |
| 2018/0076891 A1* | 3/2018 | Agrawal | ............. | H04B 10/502 |
| 2020/0235886 A1 | 7/2020 | Salim | | |
| 2020/0273346 A1* | 8/2020 | Wang | ..................... | G06N 3/098 |
| 2021/0356279 A1* | 11/2021 | Szigeti | ............... | G01C 21/3407 |

OTHER PUBLICATIONS

Colin De Vrieze et al., UC Berkeley, "Cooperative Multi-Agent Reinforcement Learning for Low-Level Wireless Communication"—Jan. 14, 2018.
A.M. Ramirez-Aguilera et al., "A Review of Indoor Channel Modeling Techniques for Visible Light Communications"—Nov. 2018.
Jeremiah Abolade et al., "Handover in Mobile Wireless Communication Network—A Review", International Journal of Advanced Engineering, Management and Science (IJAEMS), vol. 3, Issue 9—Sep. 2017.
Latif Ullah Khan, Department of Electrical Engineering, University of Engineering & Technology, Peshawar, Pakistan, "Visible light communication: Applications, architecture, standardization and research challenges"—Jul. 18, 2016.
Alain Richard Ndjiongue et al., "An Overview of Outdoor Visible Light Communications" article in Transactions on Emerging Telecommunications Technologies—May 2018.
Lucian Busoniu et al., "Multi-agent Reinforcement Learning: An Overview"—Jul. 2010.
PCT International Preliminary Report On Patentability issued for International application No. PCT/IN2020/050748—Jun. 16, 2022.
PCT Notification of Transmittal of the International Search Report and the Written Opinion of the International Searching Authority, or the Declaration issued for International application No. PCT/IN2020/050748—Dec. 3, 2020.
Notice of First Review issued for Chinese Patent Application Serial No. 202080103499.2—Oct. 9, 2024.
European Supplementary Search Report issued for Application No. / Patent No. 20951315.9-1206/ 4204834 PCT/IN2020050748—Apr. 19, 2024.
Partial European Search Report issued for Application No. / Patent No. 20951315.9-1206 / 4204834 PCT/IN2020050748—Sep. 1, 2023.

* cited by examiner

400

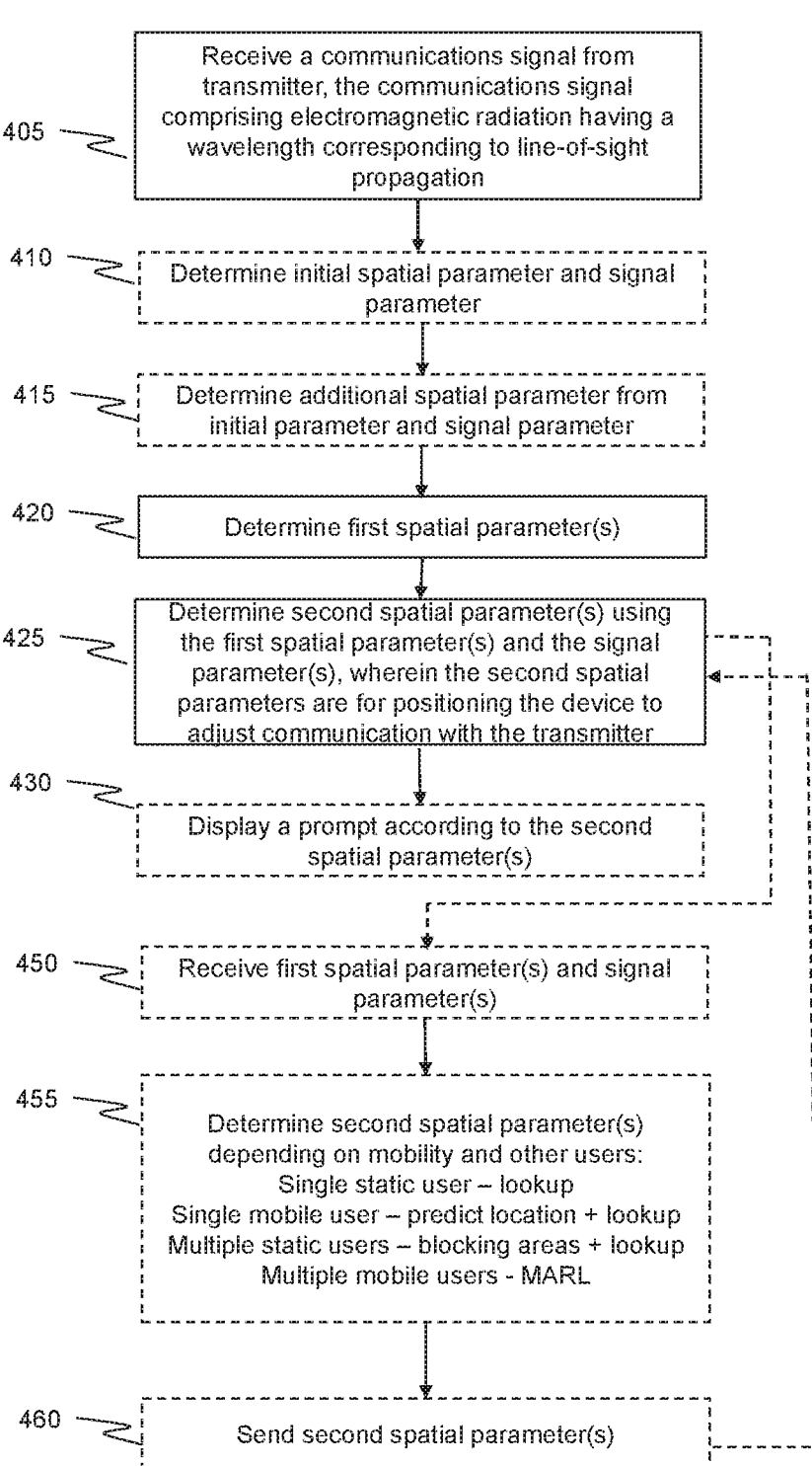

405 — Receive a communications signal from transmitter, the communications signal comprising electromagnetic radiation having a wavelength corresponding to line-of-sight propagation 410 — Determine initial spatial parameter and signal parameter 415 — Determine additional spatial parameter from initial parameter and signal parameter 420 — Determine first spatial parameter(s)

425 — Determine second spatial parameter(s) using the first spatial parameter(s) and the signal parameter(s), wherein the second spatial parameters are for positioning the device to adjust communication with the transmitter 430 — Display a prompt according to the second spatial parameter(s)

450 — Receive first spatial parameter(s) and signal parameter(s)

455 — Determine second spatial parameter(s) depending on mobility and other users:
Single static user – lookup
Single mobile user – predict location + lookup
Multiple static users – blocking areas + lookup
Multiple mobile users - MARL 460 — Send second spatial parameter(s)

Figure 4

POSITIONING A DEVICE

PRIORITY

This nonprovisional application is a U.S. National Stage Filing under 35 U.S.C. § 371 of International Patent Application Serial No. PCT/IN2020/050748 filed Aug. 27, 2020 and entitled "POSITIONING A DEVICE" which is hereby incorporated by reference in its entirety.

TECHNICAL FIELD

Examples of the present disclosure relate to positioning of a device capable of communicating using electromagnetic radiation having a wavelength corresponding to line-of-sight propagation, in order to improve this communication.

BACKGROUND

Line-of-sight communications using visible light, infrared and ultra-violet light allow communication in environments that may be difficult for other types of communications to operate in. For example, fifth generation (5G) telecommunications networks as specified by the Third Generation Partnership Project (3GPP) are evolving to empower new services and use cases for users including people and machines or autonomous or semi-autonomous devices enabling the Internet of Things (IoT). However, 5G uses radio frequencies that may encounter difficulties servicing some environments such as rooms within buildings, where the electromagnetic radiation used may not be able to penetrate the walls of the room. Optical communications methods offer a way to complement radio frequency based methods such as 5G when these are unavailable.

Whilst optical carriers can provide high bandwidth low latency communications, because of their line-of-sight propagation characteristics they are prone to blocking by static and moving objects and are sensitive to the positioning and/or orientation of a device with respect to an optical transponder.

By considering smartphones and tablets market growth and the advent of the Internet of Things (IoT), it is expected that the number of devices willing to connect to the internet will rise considerably in indoor environments, even for small rooms, so that multiple access has to be taken into account. Indoor access to the internet via visible light communication (VLC) technology is gaining interest as a solution and system planning has been considered in "*A Review of Indoor Channel Modeling Techniques for Visible Light Communications*". 2018 *IEEE* 10*th Latin-American Conference on Communications* (LATINCOM). Here the number of Light Emitting Diodes (LEDs) to be used were considered as well as how to accommodate multiple users simultaneously. However, to make VLC practical, various challenges must be addressed such as robust channel modelling for accommodating interference and/or managing handover, as well as user mobility causing shadowing and blocking

SUMMARY

It is an object of the present disclosure to provide improved methods and apparatus for positioning devices using light-of-sight electromagnetic radiation for communications.

In one aspect the is provided a method of positioning a device to communicate with a transmitter. The method comprises receiving a communications signal from the transmitter, the communications signal comprising electromagnetic radiation having a wavelength corresponding to line-of-sight propagation. A first spatial parameter of the device and a signal parameter of the communications signal is determined using the received communications signal. A second spatial parameter is determined using the first spatial parameter and the signal parameter, the second spatial parameter for positioning the device to adjust communication with the transmitter.

This allows a user of the device to improve communications using a line-of-sight communications signal by repositioning the device. Similarly, an autonomous device may be instructed to move to a better position. Embodiments enable this in environments such as indoor rooms where the user may be moving and other there may be other users who may otherwise block each other from receiving the communications signals. Embodiments may be applicable to Visible Light Communications (VLC) networks and other line-of-sight based communications systems and may be used for example to supplement communications with cellular and other technologies where a signal may not be able to penetrate into the room.

Embodiments may be used in different situations such as static single user, mobile user, multiple static users and multiple mobile users. In the last situation, a Multi-Agent Reinforcement Learning (MARL) machine learning approach is used in some embodiments. This allows a cooperative approach to maximizing overall connectivity of all users whilst allowing improvements to individual users where possible without degrading the connectivity of other users, or in some cases at the expense of some degradation in communication for a minority of users in order to improve communication for a majority of users.

Embodiments may provide a number of advantages including: improved communications using line-of-sight signals; improved security; fast and/or real-time repositioning information; coordination of multiple users within a line-of-sight signal based communications network.

In another aspect, there is provide a method of positioning a device to communicate with a transmitter. The method comprises receiving from the device a first spatial parameter of the device and a signal parameter of a communications signal between the device and transmitter, the communications signal comprising electromagnetic radiation having a wavelength corresponding to line-of-sight propagation. A second spatial parameter is determined using the first spatial parameter and the signal parameter, the second spatial parameter for positioning the device to adjust communication with the transmitter. The second spatial parameter is sent to the device.

In another aspect there is provided apparatus for performing the methods described herein.

In one aspect the apparatus may comprise a device having a receiver to receive a communications signal from a transmitter, the communications signal comprising electromagnetic radiation having a wavelength corresponding to line-of-sight propagation. The device has a processor and memory which contains instructions (332) executable by said processor, whereby the device is operative to determine a first spatial parameter of the device and a signal parameter of the communications signal using the received communications signal, and to determine a second spatial parameter using the first spatial parameter and the signal parameter, the second spatial parameters for positioning the device to adjust communication with the transmitter.

In another aspect the apparatus may comprise a server having a processor and memory containing instructions executable by said processor whereby the server is operative to receive a first spatial parameter of a device and a signal parameter of a communications signal between the device and a transmitter, the communications signal comprising electromagnetic radiation having a wavelength corresponding to line-of-sight propagation, to determine a second spatial parameter using the first spatial parameter and the signal parameter, the second spatial parameter for positioning the device to adjust communication with the transmitter, and to send the second spatial parameter to the device.

According to certain embodiments described herein there is also provided a computer program comprising instructions which, when executed on a processor, cause the processor to carry out methods described herein. The computer program may be stored on a non-transitory computer readable media.

BRIEF DESCRIPTION OF THE DRAWINGS

For a better understanding of examples of the present disclosure, and to show more clearly how the examples may be carried into effect, reference will now be made, by way of example only, to the following drawings in which:

FIG. 4 is a flow chart of an example of a method of positioning a device according to an embodiment.

DETAILED DESCRIPTION

Figure 1:
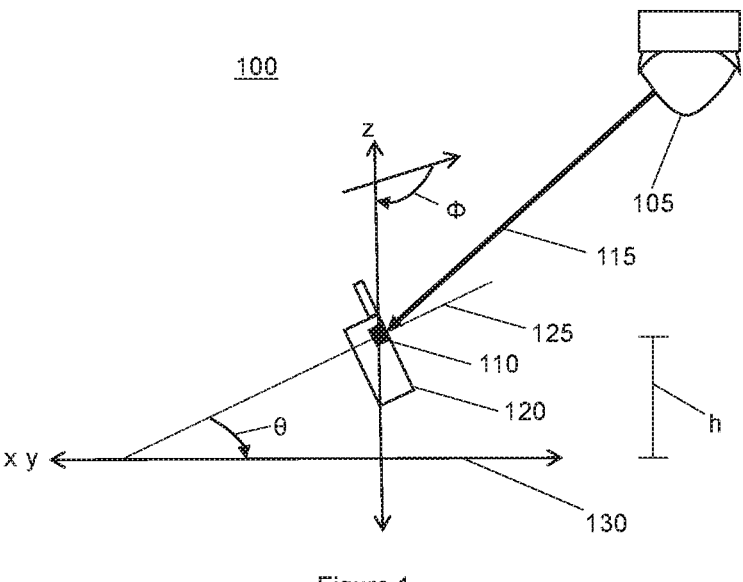
FIG. 1 illustrates a side view of a device using line of sight (LOS) communications.

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Embodiments relate to device positioning to enhance communications in optical and other line-of-sight communications networks. This can be used to avoid blocking by static and moving objects and to optimize the bandwidth available for communications.

In this specification, the term electromagnetic radiation having a wavelength corresponding to line-of-sight propagation may include visible light or optical signals, infrared and ultraviolet light, as well as high frequency microwaves and other electromagnetic radiation having a wavelength short enough to allow for line-of-sight propagation. For example, electromagnetic radiation in millimeter waveband (mmWave), which range from 20 GHz to 300 GHz may be employed for sixth generation (6G) communications systems and such systems may benefit from embodiments.

A device may communicate with a transmitter within an environment such as a room using signals having light-of-sight propagation between the transmitter and a receiver of the device. The transmitter may comprise a Light Emitting Diode (LED) and the receiver of the device may comprise a photodiode. In an example the transmitter may form part of a Visible Light Communications (VLC) base station (BS) which may also comprise a receiver. The device may be a smartphone or other Mobile Terminal (MT) operated by a user, although mobile autonomous devices such as robots, drones or moveable sensors may also be used in embodiments. Whilst some devices may utilize dedicated receivers, other devices may reuse existing capabilities such as camera in the smartphone.

The base station may be installed on the ceiling or underside of the roof of an indoors room or other environment in order to minimize blocking by other users or objects. The room may include a number of base stations spaced out across the ceiling in order to provide coverage across the room. Devices may handoff to different base stations as they move across the room and/or are blocked by other users or objects. The position of the devices may also be adjusted to avoid blocking and/or enhance signal reception. Whilst this could be achieve manually using a trial and error approach by users, embodiments provide a method of positioning which can quickly optimize signal reception and may also predict the movement of the device as well as other users or objects through the environment in order to ensure optimal signal reception over time.

VLC is an emerging wireless communication technology developed based on white LED technology, although it can in principle be applied to other colored LED and other types of lighting such as fluorescent tubes albeit at greatly reduced bandwidth. As an important demand in people's daily life, lighting is significant for a variety of human activities and environments, including homes, businesses, public places, vehicles, mines, gas stations, hospitals, many of which may even not yet be connected to a traditional wireless communication network. VLC may enable combining communication and illumination, and realize the wireless communication functionality by means of a widely covered illumination network, so that a wireless network can be connected as long as there is a lighting facility.

Although VLC has many advantages, the visible light wavelength is short and is absorbed in large amounts in the atmosphere, resulting in short communication distance, impediment blockage, and a large number of unidirectional channels, which require hybrid handover methods to supplement. Moreover, the network architecture, signaling flow and management system of a single communication access technology are often designed for specific services, and have their own independent resource management mode. There may interference between these systems, coverage areas may be duplicated, and the service provision capability of each type of LED may be limited. This situation has led to the need for coordination and intercommunication of different types of handover technologies, and the establishment of homogenous networking systems and mechanisms has become relevant to efficient and reliable transmission of homogenous networks for visible light communication (VLC).

However, in practical applications, the visible light signal may be weakened in various cases to the extent that the device cannot communicate normally due to a multiuser environment and/or device mobility. In order to facilitate a reliable connection between the device and a network having one or more base stations, the line-of-sight (LOS) communication signals need to be managed to avoid the interruption of data transmission for example by opaque object interference or blocking and enable horizontal switching between base stations.

In an embodiment, positioning of a device may be enabled by first establishing a current position of the device within an environment such as a room and which may be defined by one or more first spatial parameters. This first position together with the quality of the signal received from a transponder within the environment may be used to recommend a new or second position having superior communications parameters such as higher bandwidth, reduced interference, lower blocking risk. Achieving the second position may be performed using prompts to a user of the device or locating instructions to an autonomous device using one or more second spatial parameters defining the new position.

Whilst in some circumstances a device may be able to establish its first position sufficiently accurately using onboard sensors providing Global Positioning System (GPS), compass or barometric pressure readings, this may not always be possible, for example a GPS signal may be blocked inside a building. Therefore, the first position of the device may need to be estimated using other parameters. For example, the first position of the device may be estimated using initial spatial parameters such as tilt angle and height above a floor as well as one or more signal parameters such as data rate of communications signal. Data rate of the communications signal is readily available using well known procedures and is not further described here. Other signal parameters may alternatively or additionally be used, including for example signal strength (e.g. optical power or luminosity), bandwidth, photodiode analog voltage. Tilt angle may be determined using accelerometers in a Smartphone for example, or may be provided using apps downloaded onto a smartphone. and refers to the angle between the normal of the receiver on the device and the floor plane of the environment as illustrated in FIG. 1. Height above the floor plane may be determined using a accelerometers and gyroscopes on a smartphone, additionally or alternatively barometric pressure sensors may be employed that could be compared with a lookup table for the respective floor height.

The initial spatial parameters and the signal parameter(s) may be used to establish first spatial parameters defining the current position of the device within the environment. For example initial parameters tilt angle and height may be used together with the data rate to determine additional spatial parameters such as the xy position of the device on the floor plan and the orientation of the receiver relative to the direction of the base station. The initial and additional spatial parameters may then form the first spatial parameters which are used together with the data rate or other signal parameter(s) to generate second spatial parameters corresponding to an improved device position for communicating with the current or a different base station. Generating the second spatial parameters may occur within the receiver but in other embodiments the first spatial parameter and signal parameter may be provided to a server which generates the second spatial parameters and either provides these to the device or provides movement instructions or prompts to enable the device to move to a new position defined by the second spatial parameters. The server may have knowledge of other users in the room and therefore may be able to provide improved recommendations for moving the device taking into account the blocking risk of the other users whether as static or moving objects.

FIG. 1 illustrates a side view of a device using LOS communications with a base station in an environment such as a room inside a building. The device 110 comprises a receiver 120 which receives a LOS communications signal 115 from a base station 105. The communications signal 115 comprises electromagnetic radiation having a wavelength corresponding to LOS propagation, such as visible light for example. The receiver 120 is located at a height h above the floor 130 of the room, with the base station 105 being at a known height above the floor. The device 110 has a tilt angle $\theta$ which is the angle between the normal 125 of the receiver and the plane xy of the floor 130, assuming this is horizontal. The tilt angle may be determined using accelerometers in the device and will affect the angle of incidence of the signal 115 upon the receiver. As the angle of incidence (in the z-axis) moves away from 0 degrees, the received signal will weaken and may be interrupted for example at angles of incidence less than or greater than 30 degrees.

The angle of incidence (in the xy plane) will also be affected by the orientation $\phi$ of the receiver in an azimuth direction, for example North. Again, as the angle of incidence (in the xy plane) moves away from 0 degrees towards the base station, the signal will weaken and may be interrupted.

Figure 2:
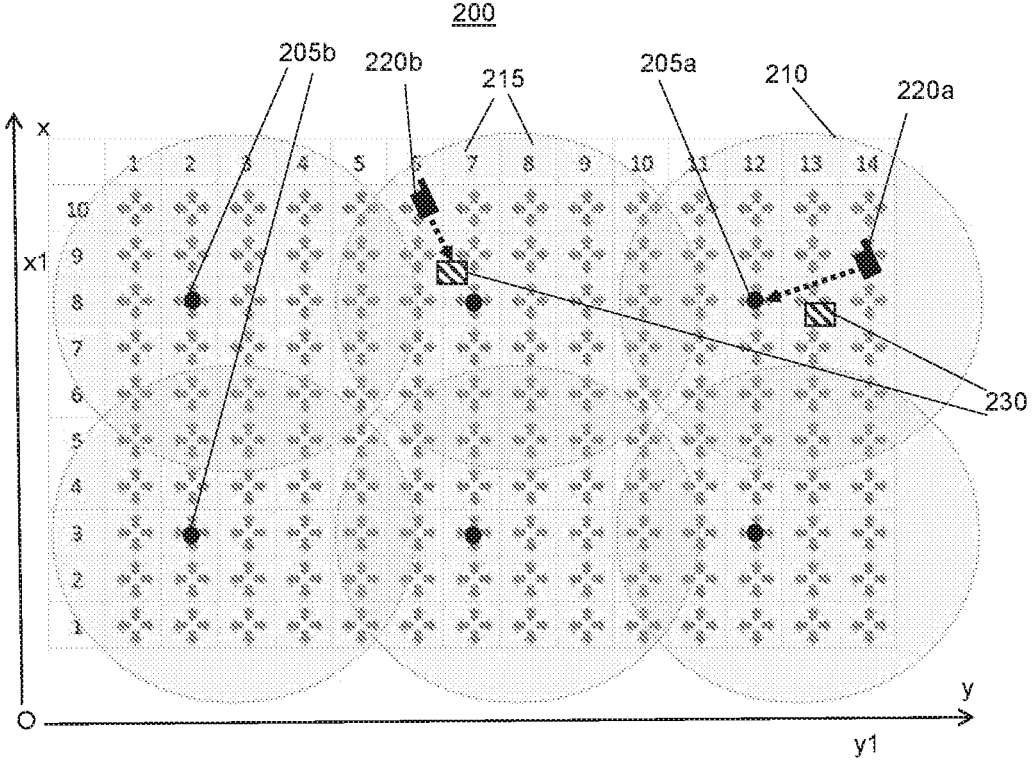
FIG. 2 illustrates a plan view of devices using LOS communications.

FIG. 2 illustrates a plan view of a device 220a using LOS communications with a base station 205a in an environment 200 such as a room inside a building. The room may contain other devices 220b and other base stations 205b. Each base station 205 comprises a coverage area 210 over which LOS signals may propagate and subject to lack of blocking may be received by devices. The room may be divided into portions 215 extending in x and y directions. In this example the first device 220a is located at xy coordinates x1, y1 corresponding to portion x=9 and y=14. The xy coordinates correspond to the floor plane of the room 200. The room may contain blocking objects 230 which may block a LOS signal from one or more base stations 205. For example, it can be seen that one of the blocking objects is blocking a LOS signal from one of the base stations to a second device 220b. The blocking objects 230 may be static such as furniture or columns within a room or they may be mobile such as the bodies of users of devices.

Figure 3:
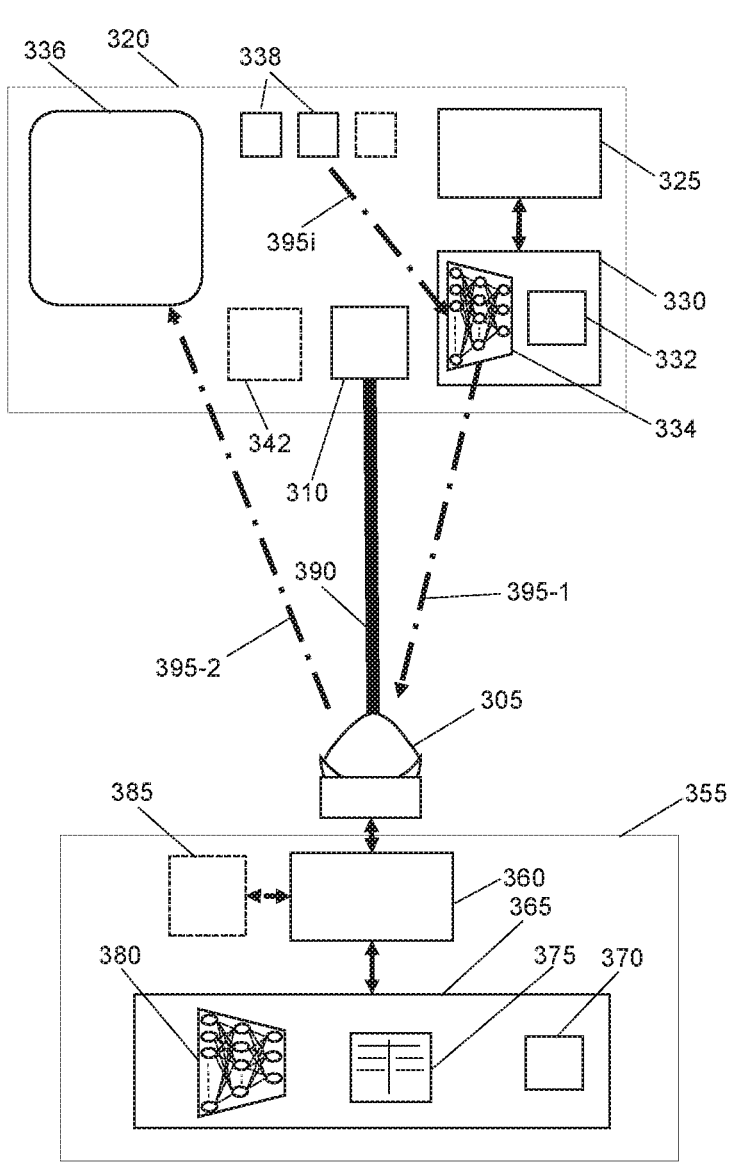
FIG. 3 is a schematic of a device and base station according to an embodiment.

FIG. 3 is a schematic of a device and a base station and server according to an embodiment. The base station 305 may be any suitable VLC transceiver which is coupled to a server 355, although in some embodiments the base station may incorporate the server functionality. The base station 305 may comprise one or more LED of different colours and may modulate these using on/off switching or other methods in a combination that maintains a combined LED output of white light such that the modulation of individual LED's is not observable by a human user of the system. Different channels to different users may be provided using time-division multiplexing and/or wavelength division multiplexing. An environment such as a room may have a plurality of base stations 305 supporting communications with one or more devices, with the ability to handover between base stations when the device moves out of range of it current base station or is blocked by an object.

The or each device 320 comprises a processor 325 and memory 330, a receiver 310, one or more sensors 338 and a display screen 336. The receiver 310 may be a photodiode arranged to receive a communications signal 390 comprising electromagnetic radiation having a wavelength corresponding to LOS propagation. Such a signal may be carried on visible light, infrared or ultraviolet light, high frequency radio carriers or other signals have LOS characteristics. The device 320 may also comprise a transmitter such as one or more LED's to enable duplex communication with a base station. The device may communicate with the server 355 via the base station 305 or using an alternative communications channel such as via radio communications such as WiFi/WLAN using a WiFi transceiver 342. The display screen 336 may be used to display prompts to a user of the device 305 to move the device to a better position for communicating with the current or a new base station 305. The sensors 338 may include accelerometers, gyroscopes, barometric pressure sensors, a GPS receiver/processor, magnetometer.

The memory 330 contains instructions 332 executable by the processor 325 to carry out methods according to embodiments as described in more detail below. The memory 330 also comprises a machine learning algorithm 334 for determining additional spatial parameters such as xy coordinates from initial spatial parameters such as tilt angle θ and height h determined from the sensors 338 as well as one or more signal parameters such as data rate of the communications signal 390. The machine learning algorithm 334 may comprise a multivariate polynomial having a number of variables corresponding to the initial and additional spatial parameters and the signal parameter(s) together with coefficients previously determined for the environment in which the device is operating. Numerical methods such as Groebner bases may be used to solve for the additional spatial parameters.

An example equation or curve obtained experimentally for a specific room is shown below:

$$\text{Average DataRate}=0.2639x^3+0.3119x^2y-0.0019x^2z+$$
$$0.4475xy^2+0.0024xyz-0.1481y^3+2.2362x^2+$$
$$2.7234xy-0.0225xz+0.4087y^2+0.009yz-$$
$$0.0051y\theta-0.0018z^2+8.5276x+4.8262y+0.1241z+$$
$$16.8346$$

Standard multiple regression techniques may be employed to determine a corresponding multivariate polynomial for other rooms.

The room-specific multivariate polynomial may be provided to the device upon entering the room or polynomials for a number of different rooms may be prestored in the device's memory 330. The room-specific multivariate polynomial may be predetermined by measuring signal strength and/or other signal parameters associated with light transmitted from the or each base station in the room, at various xy coordinates, heights, tilt angles θ and orientation angles φ. From these measurements, the average data rate of a signal can be expressed as a function of the spatial coordinates of the room including x, y, z coordinates from an origin O within the room and tilt angle θ This can be determined using regression analysis to determine a room-specific multivariate polynomial. The data rate for a specific transmitter or base station can therefore be expressed as DataRate=function (x, y, z, θ).

The server 355 is coupled to one or more base stations 305, for example via a LAN or WLAN, and comprises a processor 360 and memory 365. The server may communicate with one or more devices 320 via the base station(s) 305 using the LOS signal 390 or via another communications method such as WiFi using a WiFi transceiver 385. The memory 365 contains instructions 370 executable by the processor 360 to carry out methods according to embodiments as described in more detail below. The memory 370 also comprises machine learning algorithms 370, 380 for generating second spatial parameters corresponding to a new position for the device at which improved communication with the current or another base station is available. For example the new position may correspond to adjusting the tilt angle to improve received signal strength from the current base station or changing orientation and height to receive a stronger or less likely to be blocked LOS signal from a different base station.

The machine learning algorithm 375, 380 used may depend on the situation of the environment and/or other users. For example, different algorithms may be used for the following situations: single static user; single mobile user; multiple static users; multiple moving users.

FIG. 4 is a flow chart of an example of a method of positioning a device according to an embodiment. The method 400 may be implemented by a device 120, 220, 320 as previously described, a base station 105, 205, 305 and/or server 355 as previously described, or by other apparatus.

At 405, the method 400 receives a communications signal 115, 390 from a transmitter 105, 205, 305, for example using a camera of a smartphone device 120, 220, 320. This signal comprises electromagnetic radiation having a wavelength corresponding to line-of-sight propagation; for example, visible light, infrared or ultraviolet light, radio frequencies above 20 GHz.

At 410, the method 400 determines initial spatial parameters such as height h and tilt angle θ. These may be determined from sensors 338 on a device, such as accelerometers and gyroscopes. One or more signal parameters such as data rate are also determined.

At 415, the method 400 determines additional spatial parameters from the initial spatial parameters and the signal parameter(s). The additional spatial parameters may include xy coordinates within the room, device orientation Φ, and may be calculated by solving a multivariate polynomial 334 for the room as previously described.

At 420, the method 400 determines first spatial parameters from the initial and additional spatial parameters. The first spatial parameters may be any combination of the initial and additional spatial parameters, including all of these. For example, the first spatial parameters may include xyz coordinates, tilt angle θ, orientation φ.

At 425, the method 400 determines second spatial parameters using the first spatial parameters and the signal parameter(s). This may be achieved by sending 395-1 the first spatial parameters and the signal parameter to a server 355 and in response receiving 395-2 the second spatial parameters from the server, or changes in first spatial parameters required to achieve the second spatial parameters. In an alternative arrangement, the second spatial parameters may be calculated by the device 320 using the machine learning algorithms (e.g. 375, 380) described in more detail below.

At 430, the method 400 displays a prompt on a display screen 336 according to the second spatial parameters. For example, the prompts may indicate movement in the x, y or x directions, and or changes in tilt angle θ and/or orientation φ in order to move the device 120, 220, 320 to a new position corresponding to the second spatial parameters. In alternative arrangements, sounds or other prompts may be used to guide a user in moving the device to a new position having improve signal receiving characteristics. In a further alternative, the prompts may correspond to instructions for an autonomous device to move to a new position corresponding to the second spatial parameters.

Steps 405 to 430 may be performed by a device 120, 220, 320 which may benefit from repositioning to achieve improved communications using LOS signals 115, 390. The following steps may be performed by a server 355 which provides recommended positioning for one or more such devices. However, in alternative arrangements all steps may be performed on devices.

At 450, the method 400 receives first spatial parameters and signal parameter(s). For example, a server 355 may receive these parameters from a device 120, 220, 320 using the LOS communications signal 115, 390 or another communications technology.

At 455, the method 400 determines second spatial parameters using the received first spatial parameters and signal parameter(s). The second spatial parameters may be determined using one or more methods described in more detail below. The method or algorithm 375, 380 used may depend on the situation of the device 120, 220, 320 in the room 200. For example, in a first situation where there is only a single user/device in the room 200 and the device is not moving, the method may use a lookup table 375 to find an improved location and second spatial parameters corresponding to this. In a second situation where there is only one user in the room but the user is moving, the method may predict the users future position based on past mobility patterns of the user, and use the lookup table 375 to find an improved location for that predicted future position. In a third situation where there are multiple static users, the method may determine blocking areas corresponding to users bodies and then use the lookup table 375 to find the optimal position for the device where this is not blocked. In a fourth situation where there are multiple moving users, the method may use machine learning to generate second spatial parameters for each user's device which together optimize communications with all devices. A Multi Agent Reinforcement Learning (MARL) 380 approach may be used in some embodiments.

At 460, the method 400 sends the second spatial parameters or changes in the first spatial parameters corresponding to the second spatial parameters. For example, a server may transmit these parameters to a device using the LOS communications signal 115, 390 or another communications technology.

The method 400 may be performed continuously, for example every second, or it may be performed in response to circumstances. For example, the method 400 may be performed in response to a drop in a signal parameter such as data rate which exceeds a threshold. Alternatively or additionally, the method 400 may be performed in response to the signal parameter being below a threshold. A combination of these approaches may be employed, or different approaches may be used for different situations. For example, the method 400 may be performed for a single static or mobile user situation when the data rate drops below a predetermined threshold. On the other hand, the method 400 may be performed for multiple static or mobile users when the data rate drops by more than a predetermined threshold.

Figure 5:
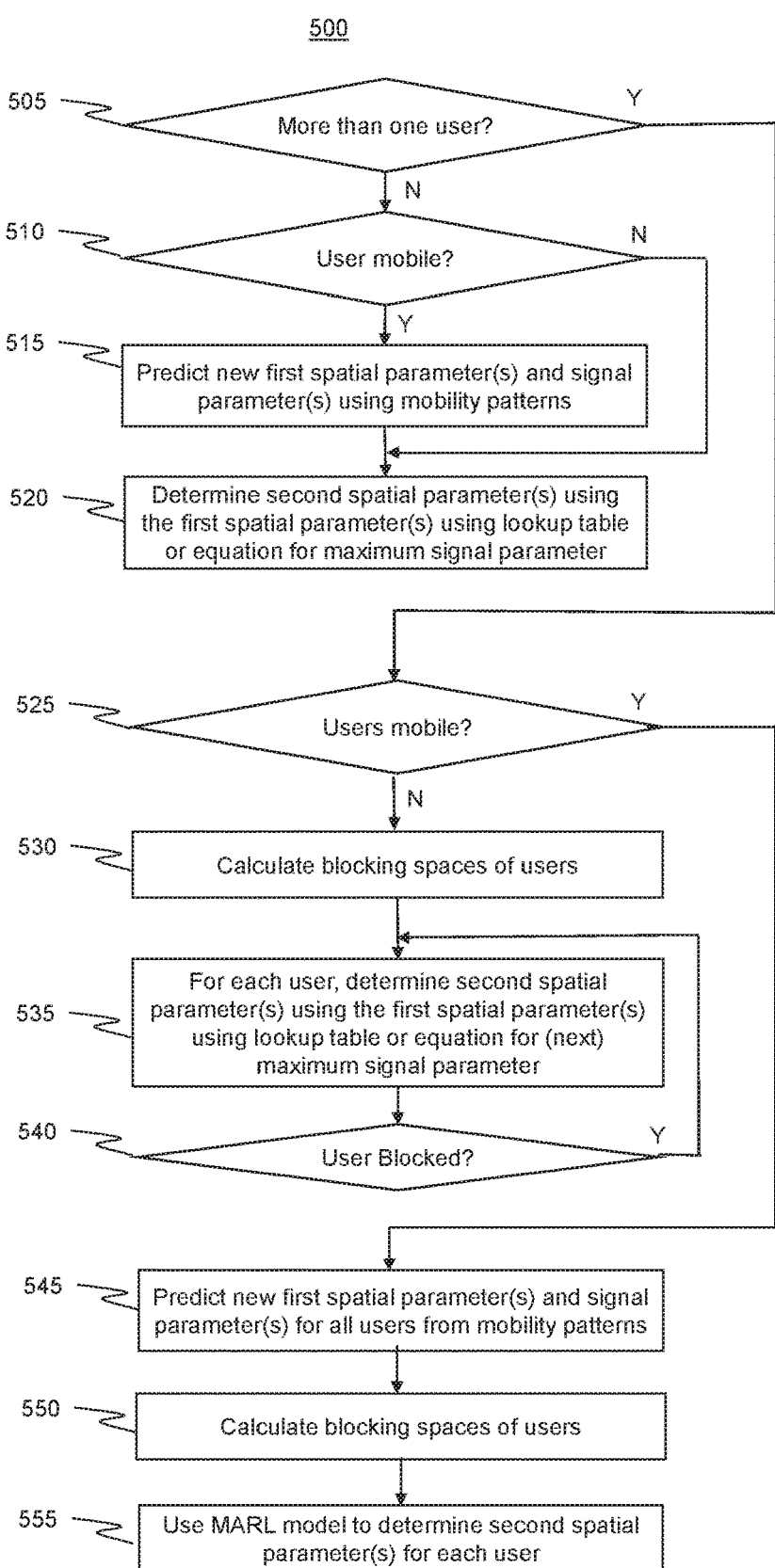
FIG. 5 is a flow chart of a method of determining second spatial parameters according to an embodiment.

FIG. 5 is a flow chart of a method of determining second spatial parameters according to an embodiment. The method 500 may be implemented by a device 120, 220, 320 as previously described, a base station 105, 205, 305 and/or server 355 as previously described, or by other apparatus. The method 500 may be used to implement step 455 of method 400 illustrated in FIG. 4.

At 505, the method 500 determines if there is more than one user in the room and if so (505Y) moves to 525. If not (505N) the method moves to 510 to determine if the single user is mobile. This may be determined from accelerometers 338 on the device 320, with this information being provided to the server 355. Alternatively, apps on a smartphone device may be used, for example step counting or a room sensor may be used to detect movement, such as a Grid EYE™ sensor for example. If the user is mobile (510Y), the method 500 moves to 515 or if the user is not mobile (510N) the method 500 moves to 520. The number of users in the room 200 may be determined from the number of devices 120, 220, 320 registered onto the network of base stations 105, 205, 305 within the room, and this information may be provided to the server.

At 515, the method 500 predicts new first spatial parameters and signal parameters using mobility patterns of the device 120, 220, 320. Various methods of predicting a future position may be employed, for example using current position and velocity to generate a future position in one or two seconds to which a recommended new position may be provided. More sophisticated approaches may use machine learning such as Long Term Short Term (LTST) networks located in the device 120, 220, 320 or server 355 an using a time series of device positions over time to predict a likely next position in a predetermined time period such as one or two seconds. Given a predicted xy position, the predicted data rate can be determined from the room-specific equation.

At 520, the method 500 determines second spatial parameter(s) using the (received or predicted) first spatial parameter(s) and the signal parameter(s). This may be achieved using a simple algorithm to find the DataRate for each height value h and tilt angle $\theta$ at the device's current or predicted xy location, and provide new second spatial parameters corresponding to the maximum DataRate at that xy location. The DataRate for each xyz and $\theta$ position in the room has been predetermined using a combination of predetermined measurements and interpolation as well as defined using the above described equation. The algorithm may proceed by calculating the DataRate using the equation or consulting a lookup table of values for a series of heights (z) and tilt angles $\theta$ for the current or predicted xy location. An example algorithm is shown below:

```
1: Input : User device datarate, Tilt angle, Height from ground
2: Output : Optimal device tilt and height recommendation
procedure Main( ) {The Main Driver function}
    3:      Set values for LxW size of room
    4:      Get input from user device for Datarate obtained, Tilt degrees
    and Height from ground of device
    5:      Define class Assign_Inputs(Datarate, Tilt, Height )
        6:      dr ← Datarate
        7:      θ ← Tilt
        8:      z ← Height
```

```
9:      Create Objects user input, best pair
10:     Get values for user position x,y = UserLocal(Datarate, Tilt,
Height)
11:     if x < L + 1 , y < W + 1 then
12:     Compute n = MatchLED(x,y)
13:     Compute best pair=BestDataRate(x,y,n)
14:     RecommendUser(user input, best pair)
15:     end if
16:     Repeat for next value of user input
end procedure
procedure UserLocal(DataRate, Tilt, Height)
17:     Set user input.z = Height, user input.θ = Tilt
18:     Compute (x, y) return (x,y)
end procedure
procedure MatchLED(x, y)
19:     Define which zone each cell belongs to
20:     Find zone 'n' where (x, y) belongs return n
end procedure
procedure BestDataRate(x,y,n)
21:     Set z ← z_m , tilt < 0
22:     while (z<=height threshold) do
        23:     while (tilt<=tilt threshold) do
                24:  dr=DatarateCalculation(x,y,z,θ,n)
                25:  if dr == maximum datarate for given (x,y) then
                        26:  set best pair.dr ← dr
                        27:  set best pair.z ← z
                        28:  set best pair. θ ← tilt
                        29:  θ ← θ +1
                30:  end if
        31:     end while
        32:     z ← z+1
33:     end while
34:     return best pair
end procedure
procedure DatarateCalculation(x.y,z,tilt,n)
35:     Compute Datarate using equation[1]
36:     return Datarate
end procedure
procedure RecommendUser(user input, best pair)
37:     output1 = user input. θ − best pair. θ
38:     output2 = user input.z − best pair.z
39:     Recommend user to shift tilt by output1 towards LED transmitter
and change height of device by output2
end procedure
```

The room's floor plane 130 is of dimensions L units length (y) and W units wide (x). The inputs to the algorithm are: DataRate obtained in device, tilt angle $\theta$ of the receiver, and the height h from the ground or floor plane 130 at which the user holds the device 120, 220, 320. These data inputs are obtained for example from the device's IMU sensors 338 and correspond to the signal parameter and the initial spatial parameters. The algorithm uses this information to localize the user by procedure UserLocal (Datarate, Tilt, Height). This procedure may provide the xy position of the device 120, 220, 320, for example using the multivariate polynomial solution approach previously described. The xy coordinates may correspond to the additional and second spatial parameters although the second spatial parameters may also include additional parameters such as device orientation $\phi$, height h (z) and tilt angle $\theta$ which may help improve accuracy of repositioning in some embodiments.

With the information on the user's position in the grid (second spatial parameters), the procedure MatchLED assigns the LED or base station zone (210) for the user at that position. Let $x_{nl}$ and $x_{nu}$ be the lower and upper limits respectively on x coordinates within the assigned base station zone LED_n—referring to FIG. 2, it can be seen that there are size LED or base station zones 210. Similarly, $y_{nl}$ and $y_{nu}$ are the lower and upper limits on y coordinates within the zone LED_n. For example, if a cell (x,y) in the grid satisfies the condition of 0<x<6 and 6<y<10, then this cell lies in the region of LED_1. The algorithm, then, exhaustively searches for an appropriate tilt and height position of the device to guarantee maximum datarate for a given (x,y) position of user. This task is carried out by procedure BestDataRate (x,y,n). In the procedure, $z_m$ represents the minimum realistic height from the ground where a user can place the device (for example, 100 cm). height threshold and tilt threshold represent two realistic values that define a comfortable limit up to which the user can adjust the height h and tilt angle $\theta$ of the device. For example, the height threshold could be fixed at 150 cm, which is close to the user's face. The tilt threshold could be fixed at 55 degrees as a comfortable amount to which user can tilt the device.

Knowing the details of the current device position, as well as the details of best orientation and height of device for given (x,y) of the user, RecommendUser provides the final output of the algorithm. The output of the algorithm i.e., output1 and output2, are the tilt degrees $\theta$ and height h of the device respectively (second spatial parameters) by which the user is recommended to adjust the device in order to receive maximum DataRate at the cell or LED zone in which the device is present located.

In some embodiments, the algorithm may be extended to also consider other base stations 105, 205, 305 having overlapping base station zones in which the device 120, 220, 320 is located. In some embodiments, where it is not possible to obtain a good signal in the current xy position, the algorithm may be extended to recommend changing xy position. Again this may be achieved iteratively by incrementing x and y positions and performing the above algorithm for different heights h and tilt angles θ, until a new position having a DataRate above a predetermined threshold better than the best DataRate available at the current xy position is achieved. If no improvement can be found in the current base station zone, adjacent base station zones 210 may be tried until a sufficient improvement is found and corresponding second spatial parameters which include new xy coordinates are output so that a user can be prompted into the new position.

At 525, the method 500 has determined that there is more than one user and now determines whether one or more of the user's is mobile. Again, this information may be provided from the user's devices 320 using their respective accelerometers 338. If none of the users are mobile (525N), the method proceeds to step 530, otherwise (525Y) the method proceeds to step 545.

At 530, the method 500 calculates blocking spaces of users by defining a volume 230 within the room 200 corresponding to the body of a user of each device 220. The user's bodies may be estimated for example at rectangular cuboid of dimensions 1.5 m height (z), and 1 m in each of the width and length xy dimensions; although different dimensions could alternatively be used. These cuboids 230 may be centered in the xy plane by the first spatial parameters provide by each device corresponding to the current position of each device. The method uses each device's orientation φ with respect to the available base stations 220 to determine whether those base stations would be partially or fully blocked at the devices current xy coordinates.

At 535, the method 500 determines second spatial parameters using the first spatial parameters and signal parameter(s). This may be implemented using the above described algorithm. The range of height h and tilt angle θ values tried may be restricted due to the above blocking determination, or all height and tilt values tried and then the height and tilt value corresponding to the maximum DataRate checked to determine whether it would be blocked by another user at 540, and if so the position corresponding to the next best DataRate checked for blocking, and so on until an unblocked position which improves the DataRate can be found. If a better position cannot be found, the algorithm may then try different xy positions for the same base station 220 and/or different orientations φ and/or xy positions for adjacent base stations.

At 545, the method 500 has determined that there are multiple moving users. The method 500 first predicts new spatial parameter(s) and signal parameter(s) for each user as described with respect to step 515. At 505, the method 500 calculates blocking spaces 230 for each user at their predicted position, as described with respect to step 530.

At 555, the method 500 uses a Multi-Agent Reinforcement Learning (MARL) network 380 to determine second spatial parameters for each user. The MARL network may not necessarily provide second spatial parameters corresponding to the best DataRate for a particular user but will aim achieve the optimal second spatial parameters considering all users. In other words, if a position for one user would maximize their DataRate but at the cost of blocking another user, then the MARL 380 would aim to provide new positions for the two users which optimize their respective DataRate whilst not impacting significantly on the other user; in other words the cumulative dataRates of the users are optimized.

Reinforcement Learning is a type of machine learning which enables an agent (user) to learn in an interactive environment by trial and error using feedback from its own actions and experiences. Multi Agent reinforcement Learning (MARL) aims to optimize some outcome for all agents where the agents may have competing interests. In an indoor VLC network scenario, if we consider each user to be an agent and the VLC network to be the external environment, a MARL can be formulated as a system in which communicating agents sense their environment, learn, and adjust their transmission parameters to maximize their communication performance and quality of service (QoS). Each user acts as an agent using reinforcement learning and the MARL can be used to optimize a collective reward function—DataRate or some other parameter as desired. These agents perceive their current states in this case first spatial parameters and signal parameter(s). This information is communicated to a centralized server and makes recommendations to each user whilst attempting to maximize the DataRate (or other defined parameter) of all agents. These recommendations here refer to the decision of the MARL model as to which action (tilt angle adjustment, height adjustment, xy shifting to another base station) would be optimal for the user to receive better data rate. Through interaction with the optical environment, these agents receive transmission rewards which are used as the inputs for the next perception and recommendation cycle.

An indoor VLC scenario that requires cooperation among multiple agents is a multi-goal multi-agent control problem where each agent needs to achieve its own individual goal, but the global optimum where all agents succeed is only attained when agents cooperate to allow the success of other agents. Here success is defined as achieving better connectivity for every user or agent, which may include handoff to another base station. The problem can be formalized as an episodic multi-goal Markov game which is a tuple $<S, \{O^n\}, \{A^n\}, P, R, G, N, \gamma>$ with N users (Agents) labeled by $n \in [N]$. In each episode, each agent n has one fixed goal $g^n \in G$ t which is to achieve better data rate. At time t and global state $s_t \in S$, each agent n receives an observation $o^n t := o^n(s_t) \in O^n$ where observations are data rate and chooses an action $a^n_t \in A_n$ to move to another better connectivity position.

The suggestion to move to another spatial coordinate is provided by the MARL model which collects and learns the information of all the users. The environment moves to $s_{t+1}$ due to joint action $a_t := \{a^1 t, \ldots, a^N t\}$, according to transition probability $P(s_{t+1} | s_t, a_t)$. Each agent receives a reward $R^n t := R(s_t, a_t, g_n)$ which is positive if the agent gets betters connectivity and negative if the agent gets poorer connectivity. T, and the learning task, is to find stochastic decentralized policies $\pi^n : O_n \times G \times A^n \to [0, 1]$, conditioned only on local observations and goals, to maximize $J(\pi) := E\pi [\Sigma^\infty_{t=0} \gamma^t P^N_{n=1} R(s_t, a_t, g^n)]$, where $\gamma \in (0, 1)$ and joint policy $\pi$ factorizes as $\pi(a|s, g) := \Pi^N_{n=1} \pi^n(a^n | o^n, g^n)$ due to decentralization. Let $a^n$ and $g^n$ denote all agents' actions and goals, respectively, except that of agent n.

Centralized Learning of Decentralized Policies:

A centralized critic that receives full state-action information can speed up training of decentralized actors that receive only local information. Directly extending the single-goal case, for each $n \in [1 \ldots N]$ in a multigoal Markov game, critics are represented by the value function $V_\pi{}^n(s) := E_\pi [\Sigma^\infty_{t=0} \gamma^t R^n_t | s_0 = s]$ and the action-value function $Q^\pi_n(s, a) := E_\pi [E^\infty_{t=0} \gamma^t R^n_t | s_0 = s, a_0 = a]$, which evaluate the joint policy $\pi$ against the reward $R^n$ for each goal $g^n$.

Multi-Agent Credit Assignment:

For $n$, $m \in [N]$, $s \in \mathcal{S}$, the credit function for goal $g^n$ and $a^m \in \mathcal{A}^m$ by agent $m$ is:

$$Q_n^\pi(s, a^m) := \mathbb{E}_\pi \left[ \sum_{t=0}^{\infty} \gamma^t R_t^n \,\middle|\, s_0 = s, a_0^m = a^m \right]$$

The cooperative multi-goal credit function-based MARL policy gradient is:

$$\nabla_\theta J(\pi) = \mathbb{E}_\pi \left[ \sum_{m,n=1}^{N} (\nabla_\theta \log \pi^m(a^m \mid o^m, g^m)) A_{n,m}^\pi(s, a) \right]$$

$$A_{n,m}^\pi(s, a) := Q_n^\pi(s, a) - \sum_{\hat{a}^m} \pi^m(\hat{a}^m \mid o^m, g^m) Q_n^\pi(s, \hat{a}^m)$$

The multi goal MARL has information from all users (agents) in the room. It has knowledge on the influence of every user on other users. The influence is based on the spatial coordinate of the users' receivers (i.e. the first spatial parameters). Data that characterizes shadow of one user on another user's receiver, is determined by the server from the user, that is the area (Sq m) that could potentially be blocked by the (cuboid) user by the virtue of his or her position and mobility. Since multiple users are interacting in the environment to optimize connectivity, this may be modeled as a MARL problem. Blocking probability can be used as a conditional probability where multiple agents interact cooperatively. The blocking probability can be defined for a single user from each user individually as:

$$P(B|A) = P(A \cap B)/P(A)$$

Here $P(A)$, $P(B)$ signifies what is the probability user A and B being present in the given location and probability of $A \cap B$ means what is the probability of user B getting blocked given user A is present in a given location. This is the conditional probability distribution i.e User A is present along with other N users in the same environment. Here, we have used the conditional probability accounting for the location of the user. So, by this non correlating positions will be eliminated automatically. This equation can be easily extended to model the interaction of N users.

The MARL problem is the formulation of interference occurring to use each user in the presence of all other users. This is the formulation of the collaborative interaction of the multiples users to maximize the common reward function. The MARL functions to provide good data rates for all users. Based on the information gained from users and the previous knowledge on influence of users, the MARL enables for improved decision making over time.

A state in reinforcement learning is some information that an agent can perceive within an environment. In RL-based indoor VLC communication, the state of an agent is the current location and average throughput value it receives. The state of the multiagent system includes the state of every agent. The state of the system at time t may be denoted by $S_t = \{G, O\}_t$ Where G=vector of spatial coordinates across all agents
O=vector of signal parameters/data rate across all agents An action in reinforcement learning is the behavior of an agent at a specific time at a specific state. In RL-based indoor VLC scenario, an action A allows an agent to either switch from one position (first spatial parameters) to a new position (second spatial parameters) So, now the actions that can be recommended for a user are:

1. Agent moves to better height
2. Agent moves to better tilt
3. Agent moves to better (x,y), this may include moving into the coverage are of another base station.

Here we define action at time t as $$A_t = k_t$$

Where $k$ is vector of all actions across all agents

A reward in reinforcement learning is a measure of the desirability of an agent's action at a specific state within the environment. In RL-based VLC Communication, the reward R is closely related to the performance of the network. The rewards for the different network conditions are as follows:

1. Incorrect prediction due to blockage: When the user recommendation algorithm fails to ensure improved quality of service (e.g. a better DataRate) due to blockage due to another user or infrastructure of a room and in such a case when the suggested user location offers a lesser average throughput (QoS) than his received throughput the system is penalized with a penalty, and a very high negative reward is imposed. This is because such a blockage would cause a drastic degradation in QoS and lead to loss of connectivity. So, the system should learn to avoid this at its best.
2. Incorrect prediction due to device orientation: When the user recommendation algorithm fails to ensure improved quality of service due to blockage of an individual user mobility or the device orientation and in such a case when the suggested user position offers a lesser average throughput (QoS) than his received throughput the system is penalized with a penalty, and a lower negative reward is imposed. This is because such a change would cause a minor degradation in QoS and not a major drop of QoS.
3. Successful prediction: When the user recommendation algorithm ensures improved quality of service by providing a suggestion to the user which gives a better average throughput, the system is rewarded with positive value.

In this way, we can apply multi-agent reinforcement learning to solve the multiuser scenario problem. Because currently each user will be interacting with the environment in the presence of another user in a collaborative way trying to maximize their common reward function and achieve the collective goal. We consider the problem of multiple agents sensing and acting in environments with the goal of maximizing their shared utility as being well suited to MARL implementation.

Embodiments may provide a number of advantages including improved security. The raw input parameters (initial spatial parameters) from the user are only utilized for computation in the receiver itself and need not be forwarded to the server. Only the processed data (first spatial parameters and signal parameters) is available to the server. Further, the server does not reveal any information received about a user to another user. The only information the server offers a user is the recommendation pertaining to that user. The system, thus, cuts out availability of users' information to other users. This is an advantage of having a centralized system as compared to a decentralized system.

Further embodiments may leverage the fundamental property of visible light communication that only users under the LoS component can access the information that is transmitted. So, users outside the field of vision of the light can't tap the information. This advantage is not available in traditional WiFi networks.

Embodiments may also provide real time fast recommendations as partial computation may happen on the receiver itself. Thus the server is less burdened and can deliver outputs ore quickly. Also, as the MARL learns from past experiences it learns to carry out lesser exhaustive searches to provide the correct user recommendation, thus making the process faster.

Quick recommendations may be achieved by partial computation on the receiver itself together with other computations made on the network edge; thereby providing recommendations more quickly.

The cooperative MARL effectively keeps in mind the expectations of all users. The reward function is maximized only when all users gain optimum data rates. This way, the data rate needs of all users are catered for in the indoor VLC environment.

Embodiments may also offer continued improvement of user recommendation. The feedback mechanism in the MARL system at the server end improves recommendations over time. The MARL in place would initially be well trained before employing in a real-time indoor VLC environment. But some unprecedented factors could affect the performance of the system in real-life scenarios. However, the feedback system between the agents and server, continuously evolve a better MARL approach. Hence, over time, the quality of recommendations is improved.

Whilst the embodiments have been described primarily as using visible light communications signals, other types of electromagnetic radiation may be used such as infrared and ultraviolet light as well as high radio frequency LOS propagating signals.

It should be noted that the above-mentioned examples illustrate rather than limit the invention, and that those skilled in the art will be able to design many alternative examples without departing from the scope of the appended statements. The word "comprising" does not exclude the presence of elements or steps other than those listed in a claim or embodiment, "a" or "an" does not exclude a plurality, and a single processor or other unit may fulfil the functions of several units recited in the statements below. Where the terms, "first", "second" etc are used they are to be understood merely as labels for the convenient identification of a particular feature. In particular, they are not to be interpreted as describing the first or the second feature of a plurality of such features (i.e. the first or second of such features to occur in time or space) unless explicitly stated otherwise. Steps in the methods disclosed herein may be carried out in any order unless expressly otherwise stated. Any reference signs in the statements shall not be construed so as to limit their scope.

The invention claimed is:

1. A method of positioning a device to communicate with a transmitter; the method comprising:
receiving a communications signal from the transmitter, the communications signal comprising electromagnetic radiation having a wavelength corresponding to line-of-sight propagation;
determining a first spatial parameter of the device and a signal parameter of the communications signal using the received communications signal; and
determining second spatial parameters using the first spatial parameter and the signal parameter, wherein the second spatial parameters are for positioning the device to adjust communication with the transmitter.

2. A device comprising:
a receiver to receive a communications signal from a transmitter, the communications signal comprising electromagnetic radiation having a wavelength corresponding to line-of-sight propagation;
a processor and memory said memory containing instructions executable by said processor whereby said device is operative to:
determine a first spatial parameter of the device and a signal parameter of the communications signal using the received communications signal; and
determine a second spatial parameter using the first spatial parameter and the signal parameter, the second spatial parameters for positioning the device to adjust communication with the transmitter.

3. The device of claim 2, operable to display a prompt to a user of the device for positioning the device according to the second spatial parameters.

4. The device of claim 2, operable to determine the first spatial parameter using an initial spatial parameter from a sensor of the device and the signal parameter to calculate additional spatial parameters, the first spatial parameter comprising one or more of the initial and/or additional spatial parameters.

5. The device of claim 2, operable to determine the first spatial parameters by calculating the device coordinates (x1, y1) using a predetermined equation or model for a space in which the transmitter is located.

6. The device of claim 2, operable to determine the second spatial parameter further by determining one or more blocking spaces corresponding to one or more users of other devices in the space in which the transmitter is located and determining an improved position having an improved signal parameter where the communication signal from the transmitter to the device at the improved position is not blocked by a said blocking space.

7. The device of claim 2, operable to determine the second spatial parameter by using predicted first spatial parameters and signal parameters which are based on a mobility pattern of a device.

8. The device of claim 2, operable to determine the second spatial parameter by using a predetermined mapping between the first spatial parameter and the signal parameter and an improved position of the device corresponding to a maximum signal parameter and finding the second spatial parameter corresponding to the improved position.

9. The device of claim 2, operable to determine the second spatial parameter further using a multi-agent reinforcement learning, MARL, model where the agents correspond to the device and one or more other devices.

10. The device of claim 2, operable to determine the second spatial parameter by sending the first spatial parameters to a server and receiving the second spatial parameter from the server.

11. A server comprising:
a processor and memory said memory containing instructions executable by said processor whereby said device is operative to:
receive from a device a first spatial parameter of the device and a signal parameter of a communications signal between the device and a transmitter, the communications signal comprising electromagnetic radiation having a wavelength corresponding to line-of-sight propagation;
determine a second spatial parameter using the first spatial parameter and the signal parameter, the second spatial parameter for positioning the device to adjust communication with the transmitter; and send the second spatial parameter to the device.

12. The server of claim 11, wherein the first spatial parameter comprises one or more of the following: a tilt angle being the angle between a floor plane and a normal of a receiver in the device used to receive the communications signal; a device height above the floor plane; device coordinates along axes of the floor plane.

13. The server of claim 11, wherein the signal parameter comprises one or more of the following:

a data rate of the communications signal;

a bandwidth of the communications signal;

received power of the communications signal.

14. The server of claim 11, operable to determine the second spatial parameters using a predetermined equation or model for a space in which the transmitter is located to find second spatial parameters corresponding to an improved signal parameter.

15. The server of claim 11, operable to determine the second spatial parameter by determining one or more blocking spaces corresponding to one or more users of other devices in the space in which the transmitter is located and an improved position having an improved signal parameter where the communication signal from the transmitter to the device at the improved position is not blocked by a said blocking space.

16. The server of claim 11, operable to determine the second spatial parameter using predicted first spatial parameters and signal parameters which are based on a mobility pattern of a device.

17. The server of claim 11, operable to determine the second spatial parameter using a predetermined mapping between the first spatial parameters and the signal parameters and an improved position of the device corresponding to a maximum signal parameter and finding the second spatial parameters corresponding to the improved position.

18. The server of claim 11, operable to determine the second spatial parameter using a multi-agent reinforcement learning, MARL, model where the agents correspond to the device and one or more other devices.

19. The server of claim 11, wherein second spatial parameter comprises one or more of the following: device coordinates or change in device coordinates; device orientation or change in device orientation; device height or change in device height; tilt angle or change in tilt angle.

20. A computer program product comprising non-transitory computer readable media having stored thereon a computer program comprising instructions which, when executed on a processor, cause the processor to carry out the method of claim 11.

\* \* \* \* \*